3,436,970
CONTINUOUS AND CONSTANT VARIABLE-RATIO
TRANSMISSION MECHANISM
César Alvarez Fernandez, Avenida de las Toreros, 24-6-1,
Madrid, Spain
Filed June 19, 1967, Ser. No. 647,027
Claims priority, application Spain, June 26, 1966,
328,314
Int. Cl. F16h 35/02
U.S. Cl. 74—393                                5 Claims

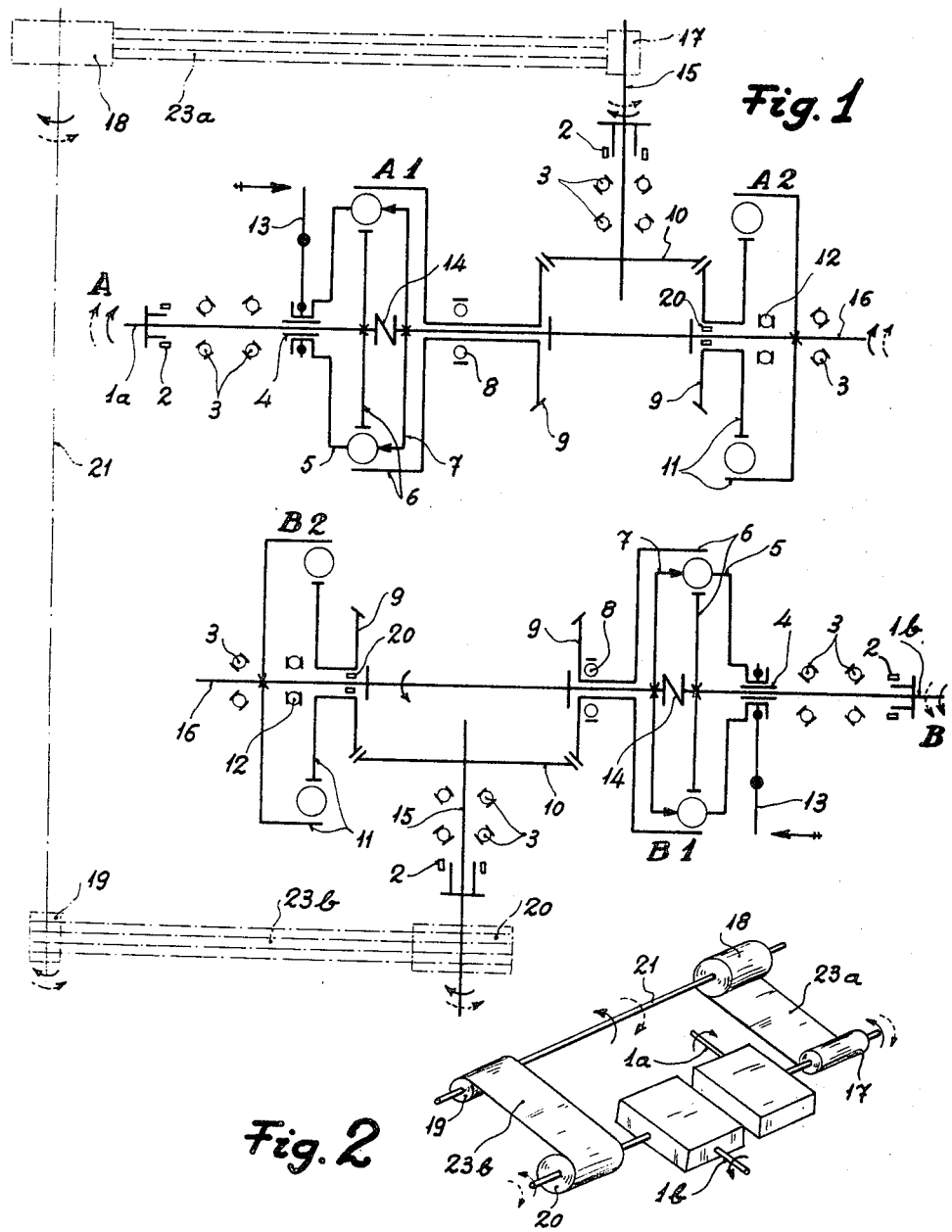

ABSTRACT OF THE DISCLOSURE

A mechanism which makes possible the transmission of a mechanical torque between two shafts joined by the said mechanism with a continuous and constant variable-ratio transmission. The transmission of the said torque is effected in an automatic manner from the shaft of greater instantaneous torque level to that of lesser instantaneous torque level, without additional regulating actions, and independently of the direction of transmission of the torque between the two shafts.

---

The characteristics of this mechanism make it suitable for a large number of applications in kinematic transmissions with levels of energy variable in the shafts joined by the said mechanism.

An especially important application may consist of including the mechanism in the transmission system of the driving wheels of a heavy vehicle, with the aim of making use of a considerable torque and producing a gradual variation of the latter until the process in question is terminated. Other applications include cranes, winches, hoisting apparatus, etc., during the phases of both starting and stopping.

The mechanism consists essentially of two bevel-gear groups each equipped with two clutch devices and respectively connected to the shafts between which the transmission of the torque is to be effected. Both bevel-gear groups include an intermediate wheel which coacts with the said two groups by means of a transmission system consisting fundamentally of pairs of drums linked by a flexible band of appropriate strength which is wound onto one of the drums while being unwound from the other, according to the direction of the torque transmission, so that through the effect of the continuous variation of the diameters of the pair of windings a variation is produced in the ratio of continuous and constant transmission during the whole time that the process lasts, the length of the said band being a function of the said time.

The mechanism has clutch devices of the free-wheel type, two of which operate automatically when the process comes to an end, with the aim of terminating the operation of the variable-ratio transmission at the necessary moment, and making it possible to situate the complex at the starting position of the process.

It is obvious that a transmission system with these charateristics can solve a large number of problems which have hitherto been solved satisfactorily only by the application of costly and complicated electrical or hydraulic mechanisms and devices.

With the aim of enabling the invention to be more easily understood, in the annexed drawings, which form part of the present application, practical examples for industrial purposes are shown; these are included merely by way of example, and consequently are not in any sense limitative of the mechanism. In the said drawings: FIGURE 1 is a diagram of the mechanism of the transmission system in accordance with the invention.

FIGURE 2 is a perspective diagram of a practical example of the invention.

As is shown in FIGS. 1 and 2, the mechanism is essentially constituted by two assemblies A and B equipped with their corresponding free-wheel clutches, A1 and A2 for assembly A, and B1 and B2 for assembly B, both assemblies including bevel-gear groups 9, 10 connected through their respective shafts 15, which form a solid unit with the intermediate bevel-gear wheel 10, by means of bands of flexble and resistant material, 23a and 23b, which join drum 17 with drum 18, and drum 19 with drum 20, drums 18 and 19 forming an integral unit with the shaft 21.

FIGURE 2 clearly shows the manner of bringing about the winding of the bands onto the respective drums. In the case being considered, the transmission of the torque is established from shaft 1a to shaft 1b, although this transmission can be in the reverse direction, but for the purposes of greater ease in interpretation the mechanism has been situated in the initial phase of the process. Each assembly, together with its respective clutch mechanism, is fundamentally constituted by a shaft 1a or 1b, which projects from the casing in which the assemblies are housed through a retainer 2, and the said shaft has pairs of tapered bearings 3 intended to absorb the axial stresses of the shafts. The shaft 1a or 1b is connected to the respective free-wheel clutch 6 or similar device which with the driving clutch member 5 and the disconnecting clutch member 7 permits the shaft 1a either to form an integral unit with the corresponding bevel-gear wheel 9, or to become independent of it. Again, the said shaft 1a can form an integral unit with the opposite wheel 9 through the clutch 11, also of the free-wheel type, whose shaft passes through the bearing 20; the system also includes the bearings 8 and 12.

The shaft 1a is joined to the shaft 16, and likewise the shaft 1b is joined to its respective shaft 16, through an elastic coupling 14 which permits a certain angular displacement between both shafts.

The bevel-gear wheel 10 forms an integral unit with the shaft 15, and the latter has a drum 17 fitted to it, united by means of the belt 23a to the drum 18; in this case of torque transmission the drum 18 is of larger diameter than the drum 17, and is joined to the drum 19 by means of the shaft 21. In this case the drum 19 is in turn linked to the drum 20 by means of the band 23b, the drum 19 being of smaller diameter than the drum 20.

The free wheel clutches A1 and B1 can respectively be manually actuated through the levers 13. The clutch A1 is connected to the left gear 9 of FIG. 1 thorugh a hollow shaft through which the shaft 1a extends to be connected to the shaft 16. In the same way the clutch B1 is connected though a hollow shaft to the right gear 9 of FIG. 1, so that the shaft 1b can pass through this hollow shaft to be connected to the shaft 16 of the lower assembly shown in FIG. 1.

In accordance with the mechanism described, if the assumption is made that the torque to be transmitted is appled to the shaft 1a rotating in the direction of the continuous arrow of FIGURE 2, this shaft will drive, through the clutch A1, the wheel 10 which will turn and, by means of the shaft 15, will move the drum 17, which drum pulls the flexible band, winding it up on itself and unwinding the band from the drum 18, which causes the drum 19 to turn in the same direction by means of the shaft 21; the said drum 19 also winds up the band 23b and unwinds it from the drum 20, whose diameter is larger. Since at the beginning of the process the whole of the bands 23a and 23b is rolled up on the drums 18 and 20 respectively, the speed transmission ratio between each pair of drums is a maximum, so that the torque transmitted by the system reaches its maximum value on shaft 1b of assembly B, or on shaft 1a of assembly A according to the direction of transmission (from A to B or from B to A).

As the load of the band wound onto the drum of initially greater diameter is transmitted to the drum of initially lesser diameter of each group, the transmission varies, to the extent that it is a ratio of transmission in continuous and constant form, until it reaches a predetermined ratio considered as the end of the process, during which the bands 23a and 23b have been transferred to the drum of initially smaller diameter, for which reason by means of a known device depending on the thickness of the layer wound onto the drums, the respective levers 13 are operated and the declutching of A1 or B1 is produced.

Transmission in the inverse sense from the shaft 1b to the shaft 1a is effected in a similar manner through the clutch B1, band 23b, band 23a, the clutch A2 and the shaft 16; the directions of rotation in this second transmission are shown by means of broken-line arrows, and it can be seen that the direction of rotation is invariable as regards the shafts 1a and 1b, although it is reversed in the intermediate elements, it being possible to return to the initial position of the mechanism.

In accordance with what has been described above, the mechanism ensures a transmission of continuous constantly varying values, increasing or decreasing, and independent of the direction in which the torque is transmitted. The maximum value of the transmission ratio is produced at the initial moment of the process, independently of the direction in which the torque is transmitted.

Again, the direction of rotation of the shafts 1a and 1b is maintained invariable, independently of the direction in which the torque is transmitted.

Another result of the invention is that the process of transmission of the torque between the shafts is established without the necessity for external regulation, and always from the shaft of greater instantaneous torque to the shaft of lesser instantaneous torque.

It is evident that the possibility exists of a large number of variants of the present invention, but in any of such cases the said invention essentially consists of two transmission assemblies each of which is provided with a pair of free-wheel clutches, and the said groups are linked to one another by means of one or more pairs of drums interconnected by windable bands.

The nature of the invention together with a practical embodiment having been sufficiently described, it is only necessary to add that in the whole and its constituent parts it is possible to introduce modifications, changes of material and arrangement provided that such alterations do not change the essential basis of the invention.

I claim:

1. A transmission of continuous and constantly varying ratio, comprising a pair of transmission assemblies each including a pair of gears and a third intermediate gear meshing with and interconnecting the pair of gears, a pair of clutch means respectively connected operatively with said pair of gears, and a terminal shaft operatively connected to said pair of clutch means of each assembly, said pair of clutch means coacting with said terminal shaft of each assembly for limiting the latter to only one direction of rotation, said terminal shafts respectively alternating as driving and driven shafts, a pair of drums respectively connected operatively with said intermediate gears for rotating simultaneously therewith, a pair of bands respectively wound on said drums initially to different extents respectively providing said drums with maximum and minimum diameters, and means interconnecting said bands for unwinding the band from the drum of initial maximum diameter while simultaneously winding the band on the drum of initial minimum diameter to achieve a continuous automatic and constant variation in the transmission of the torque between the shafts with the direction of the torque transmission being reversible while the directions of rotation of said terminal shafts remain constant.

2. A transmission as recited in claim 1 and wherein said pair of gears of each assembly are a pair of coaxial bevel gears while said clutch means are respectively free-wheel clutches respectively having clutch members operatively connected with said pair of bevel gears of each assembly for rotary movement therewith, a hollow shaft interconnecting one of said bevel gears of each assembly with a clutch member of a free-wheel clutch and a second shaft forming an extension of the terminal shaft of each assembly, extending through said hollow shaft, and operatively connected to the other free-wheel clutch of each assembly, said intermediate gear wheel being a bevel gear meshing with said pair of bevel gears and operatively connected to one of said drums for rotary movement therewith, said free-wheel clutches limiting said terminal shafts to predetermined unchanging directions of rotation while acting to reverse the direction of torque transmission when the magnitude of the resistance to torque transmission exceeds the magnitude of the transmitted torque, thus reversing the direction of winding and unwinding of the bands on said drums, respectively.

3. The transmission of claim 2 and wherein an elastic coupling interconnects the second shaft of each transmission assembly with the terminal shaft thereof.

4. A transmission as recited in claim 2 and wherein each of said transmission assemblies has one of its free-wheel clutches located adjacent the terminal shaft thereof, and manually operable means operatively connected with said one free-wheel clutch of each assembly for manually actuating the latter clutch.

5. The transmission of claim 1 and wherein said means for unwinding the band from one drum while winding the band on the other drum includes a pair of additional drums respectively connected with the bands on the drums which are respectively connected to said intermediate gear wheels, and said pair of additional drums being connected to each other for simultaneous rotation as a unit, one of the bands winding itself onto one of said additional drums while unwinding from the other drum which carries said one band, and the other of said bands unwinding at the same time from said additional drum while winding onto the other drum connected to said other band, thus providing an initial maximum transmission ratio because of the initial maximum and minimum diameters of the bands on the drums respectively connected with said intermediate gear wheels.

References Cited

UNITED STATES PATENTS

| | | | |
|---|---|---|---|
| 971,068 | 9/1910 | Oulton et al. | 74—393 |
| 2,065,484 | 12/1936 | Werder. | |
| 1,581,697 | 4/1926 | Stoeckemann | 74—393 X |
| 2,349,118 | 5/1944 | Simpson | 74—393 |
| 2,363,161 | 11/1944 | Terrell | 74—393 |

DONLEY J. STOCKING, *Primary Examiner.*

L. H. GERIN, *Assistant Examiner.*